US012596253B2

(12) United States Patent
Miyoshi et al.

(10) Patent No.: US 12,596,253 B2
(45) Date of Patent: Apr. 7, 2026

(54) VEHICULAR DISPLAY DEVICE

(71) Applicant: Yazaki Corporation, Minato-ku (JP)

(72) Inventors: Yuki Miyoshi, Makinohara (JP);
Yasuhiro Katsumata, Makinohara (JP);
Akira Yamanaka, Makinohara (JP);
Hiroshi Sano, Makinohara (JP);
Takahiro Osawa, Shimada (JP);
Tetsuya Suganuma, Shimada (JP); Yu Kobayashi, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 18/634,872

(22) Filed: Apr. 12, 2024

(65) Prior Publication Data

US 2024/0377630 A1      Nov. 14, 2024

(30) Foreign Application Priority Data

May 12, 2023      (JP) ................................. 2023-079589

(51) Int. Cl.
*G02B 27/01* (2006.01)
*G09G 3/00* (2006.01)

(52) U.S. Cl.
CPC ..... *G02B 27/0101* (2013.01); *G02B 27/0149* (2013.01); *G09G 3/001* (2013.01); *G09G 2380/10* (2013.01)

(58) Field of Classification Search
CPC ............ G02B 27/0101; G02B 27/0149; G02B 27/01; G02B 2027/0161; G09G 3/001;

G09G 2380/10; B60K 35/00; B60K 35/23; B60K 35/50; B60K 35/60; B60K 2360/785; B60K 2360/816; B60K 2360/96; G02F 1/1333; G02F 1/1335; G02F 1/133608
See application file for complete search history.

(56) References Cited

U.S. PATENT DOCUMENTS

| | | | | |
|---|---|---|---|---|
| 2015/0131160 A1* | 5/2015 | Kwak | ................ | G02B 27/0149 |
| | | | | 359/630 |
| 2016/0243942 A1* | 8/2016 | Sato | ................. | G02F 1/133606 |
| 2017/0227768 A1* | 8/2017 | Lambert | ................ | B60K 35/23 |
| 2017/0320390 A1 | 11/2017 | Sato et al. | | |
| 2021/0157137 A1* | 5/2021 | Okamura | ............... | B60K 35/60 |
| 2022/0326515 A1 | 10/2022 | Katsumata et al. | | |
| 2023/0408792 A1* | 12/2023 | Kaneko | ................ | B60K 35/231 |

FOREIGN PATENT DOCUMENTS

| | | |
|---|---|---|
| CN | 115509014 A | 12/2022 |
| CN | 218512722 U | 2/2023 |
| EP | 0054295 A2 | 6/1982 |
| JP | S57-103404 U | 6/1982 |
| JP | H06282017 A | 10/1994 |

(Continued)

*Primary Examiner* — Brent D Castiaux
(74) *Attorney, Agent, or Firm* — Banner & Witcoff, Ltd.

(57) ABSTRACT

There is provided a vehicular display device including: a display unit configured to emit a display image including display light and projected onto a projection target member provided in a vehicle; a first optical component configured to reflect the display light emitted from the display unit; a first case having a space configured to accommodate the first optical component; and a second case configured to press the first optical component accommodated in the space against the first case.

5 Claims, 6 Drawing Sheets

(56)         References Cited

FOREIGN PATENT DOCUMENTS

| JP | 2000131636 A | * | 5/2000 |
|----|--------------|---|--------|
| JP | 2008055940 A | | 3/2008 |
| JP | 2016-094147 A | | 5/2016 |
| JP | 2017-171041 A | | 9/2017 |
| JP | 2020-140136 A | | 9/2020 |
| JP | 2022-085985 A | | 6/2022 |
| JP | 2022-160754 A | | 10/2022 |
| WO | 2022097638 A1 | | 5/2022 |

* cited by examiner

*FIG.8*

VEHICULAR DISPLAY DEVICE

CROSS-REFERENCE TO RELATED APPLICATIONS

This application is based on and claims priority under 35 USC 119 from Japanese Patent Application No. 2023-079589 filed on May 12, 2023, the contents of which are incorporated herein by reference.

TECHNICAL FIELD

The present disclosure relates to a vehicular display device.

BACKGROUND ART

In recent years, a vehicle such as an automated vehicle is equipped with a vehicular display device such as a head-up display (HUD). In the vehicular display device, for example, a display image displayed on a display unit is projected onto a windshield, a combiner, or the like via an optical system such as a reflection mirror, so that a driver visually recognizes the display image as a virtual image. See JP2022-160754A, for example.

Clipping is adopted as a method of fixing a plane mirror used in a vehicular display device. However, since each fixing component requires a clearance for installation, it is required to ensure a space for fixing the plane mirror in the vehicular display device. Such a space may cause an increase in size of the vehicular display device.

SUMMARY OF INVENTION

The present disclosure provides a vehicular display device capable of reducing a space for fixing an optical component.

In order to achieve the above object, a vehicular display device according to the present disclosure has the following features.

A vehicular display device includes: a display unit configured to emit a display image including display light, the display image projected onto a projection target member provided in a vehicle; a first optical component configured to reflect the display light emitted from the display unit; a first case having a space configured to accommodate the first optical component; and a second case configured to press the first optical component accommodated in the space against the first case.

According to the present disclosure, a size of the vehicular display device can be reduced, and contamination or the like of an optical component can be prevented.

The present disclosure has been briefly described above. Further, details of the present disclosure will be further clarified by reading modes for carrying out the disclosure described below with reference to the accompanying drawings.

BRIEF DESCRIPTION OF DRAWINGS

FIG. 8 is a schematic view illustrating an optical path of external light in a vehicular display device according to another embodiment.

DESCRIPTION OF EMBODIMENTS

Hereinafter, a vehicular display device according to an embodiment of the present disclosure will be described with reference to the drawings.

Figure 1:
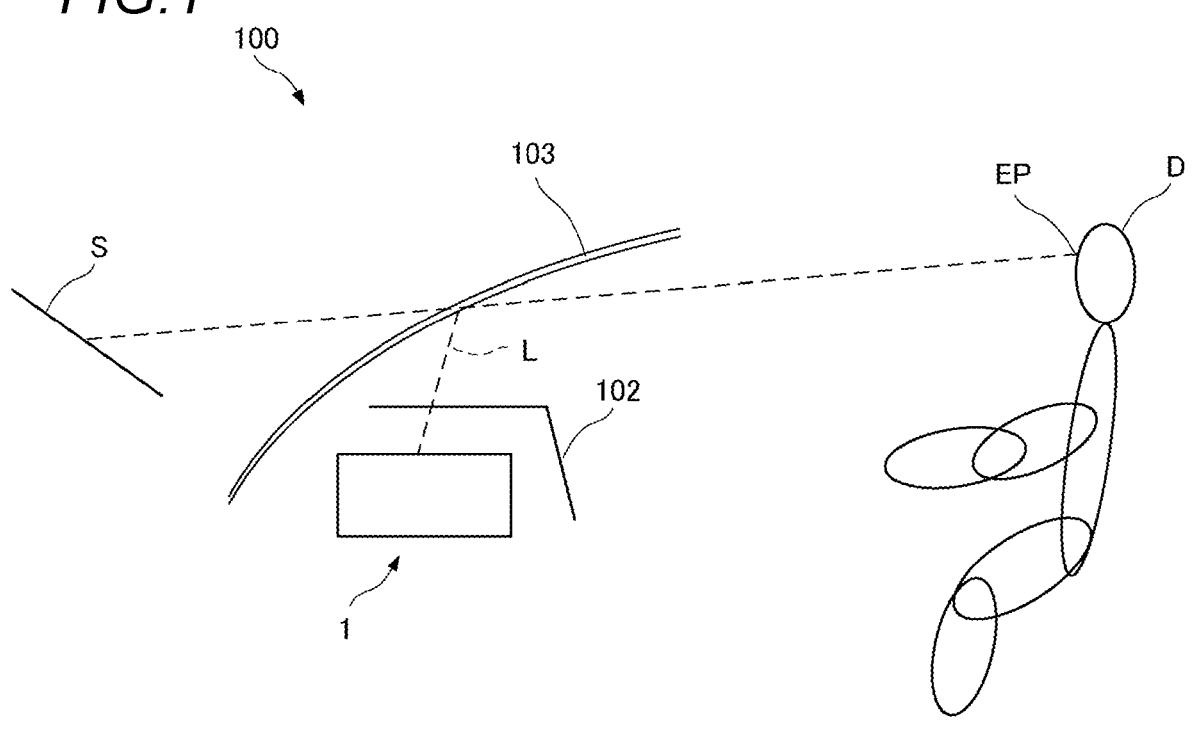
FIG. 1 is a schematic diagram illustrating a schematic configuration of a vehicle equipped with a vehicular display device.
Figure 2:
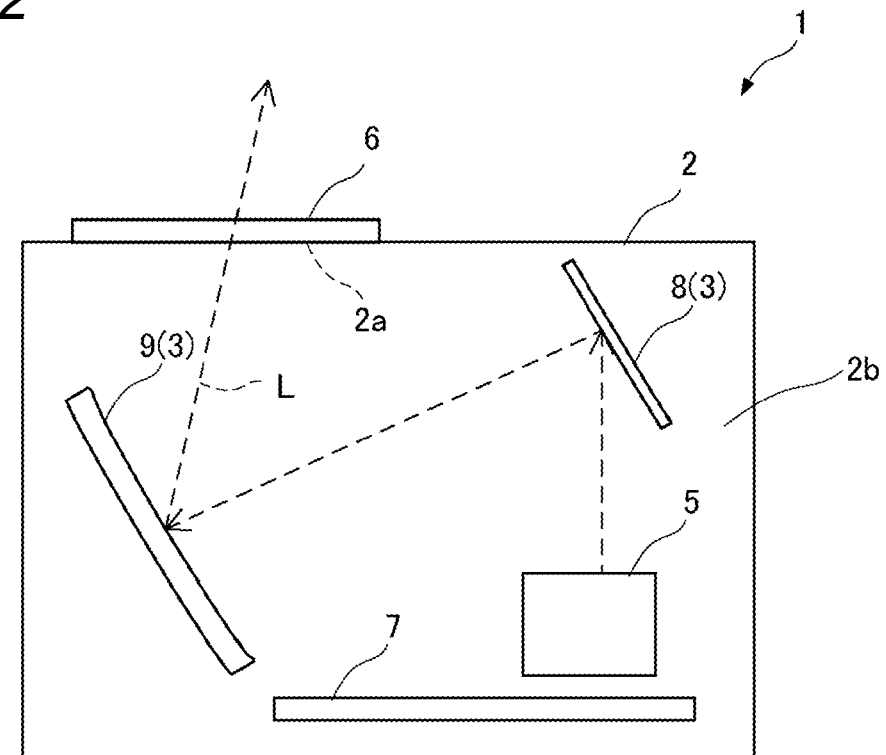
FIG. 2 is a schematic diagram illustrating a schematic configuration of the vehicular display device.

As illustrated in FIG. 1, a vehicular display device 1 is a head-up display device mounted on a vehicle 100 such as an automated vehicle. The vehicular display device 1 is disposed inside an instrument panel 102 in the vehicle 100, and projects a display image onto a windshield 103 that is a projection target member. Since the windshield 103 has a semi-transparent property of reflecting a part of incident light and transmitting remaining light, the windshield 103 reflects display light L emitted from the vehicular display device 1 as a display image toward an eye point EP of a driver D while transmitting foreground of the vehicle 100. The driver D is an occupant of the vehicle 100, a driver in particular, and recognizes the display image reflected by the windshield 103 as a virtual image S. The virtual image S is recognized by the driver D in front of the windshield 103. As illustrated in FIG. 2, the vehicular display device 1 according to the present embodiment includes a housing 2, two reflection mirrors 3, a backlight unit 5, and a control unit 7.

The housing 2 is formed of, for example, synthetic resin, and is fixed to a vehicle body (not illustrated). As illustrated in FIG. 2, the housing 2 accommodates and supports the backlight unit 5, the two reflection mirrors 3, and the control unit 7 in an internal space 2b. The housing 2 has an opening 2a through which the outside communicates with the internal space 2b. The opening 2a is provided in the housing 2 at a position facing the windshield 103, and is closed by a cover member 6. The display light L emitted from the backlight unit 5 and reflected by the two reflection mirrors 3 is transmitted through the cover member 6. The display light L transmitted through the cover member 6 travels toward the windshield 103.

The two reflection mirrors 3 are disposed on an optical path of the display light L from the backlight unit 5 to the windshield 103, and reflect the display light L emitted from the backlight unit 5 toward the windshield 103. The two reflection mirrors 3 include a plane mirror 8 serving as a first optical component and a concave mirror 9 serving as a second optical component.

The plane mirror 8 has a reflection surface formed as a plane and is disposed at a position facing the backlight unit 5. The reflection surface of the plane mirror 8 totally reflects the display light L emitted from the backlight unit 5 toward the concave mirror 9.

The concave mirror 9 has a reflection surface formed as a concave curved surface and is disposed at a position facing the plane mirror 8. The concave mirror 9 totally reflects the display light L reflected by the plane mirror 8 toward the windshield 103 via the cover member 6. For example, the concave mirror 9 has a function of a magnifying mirror. The concave mirror 9 enlarges and reflects a display image represented by the display light L reflected by the concave mirror 9 such that the display image is relatively larger than a display image represented by the display light L before being reflected by the concave mirror 9.

The backlight unit 5 is an example of a display unit, and emits, as the display light L, a display image to be visually recognized as the virtual image S by the driver D of the vehicle 100. The backlight unit 5 includes a display panel 11 (see FIG. 4) and a light source (not illustrated) in a housing having an opening. Although the backlight unit 5 in the present example includes components such as a condenser lens and a deflector lens, these components are not essential. The backlight unit 5 is a display unit that emits, as display light, a display image to be projected onto the windshield 103 that is a projection target member.

The control unit 7 is connected to the backlight unit 5 and controls the backlight unit 5. The control unit 7 includes, for example, an IC chip mounted on a substrate, and is driven by electric power obtained from a battery mounted on the vehicle 100.

Figure 3:
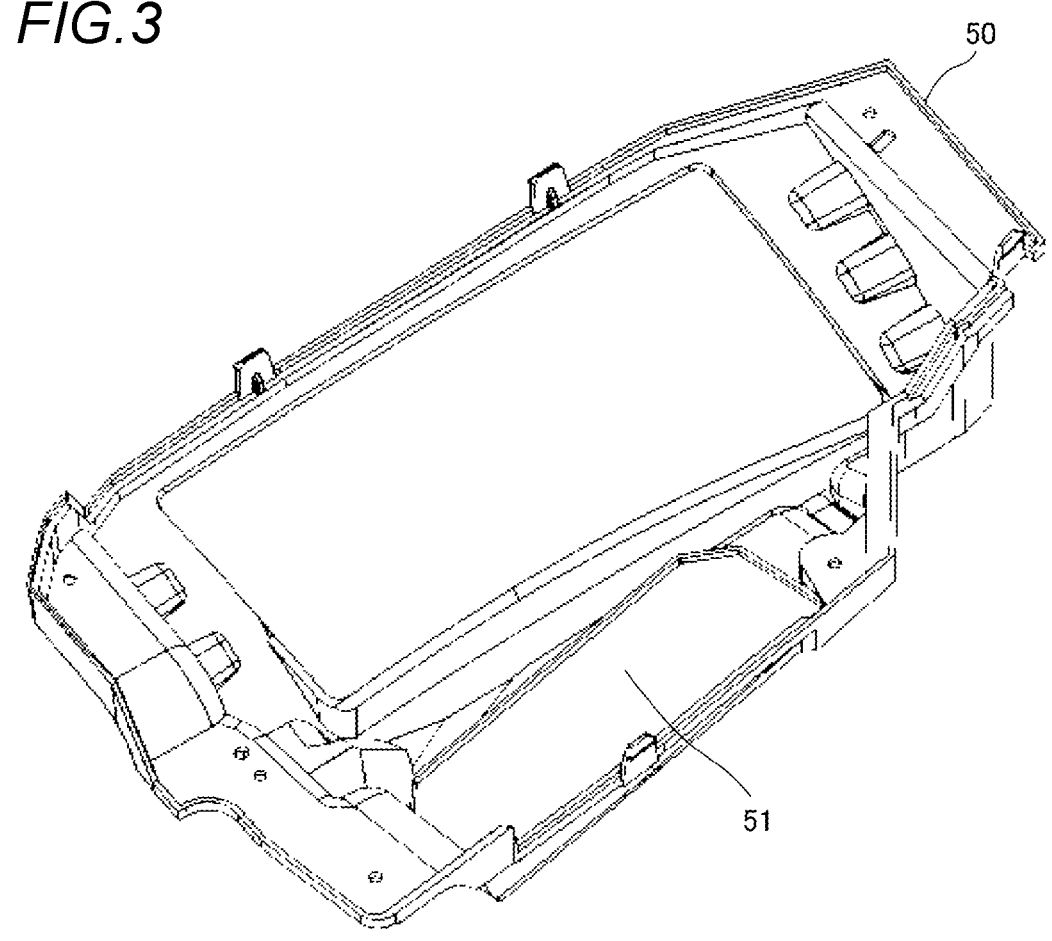
FIG. 3 is a perspective view illustrating an upper case of the vehicular display device according to an embodiment as viewed from below.
Figure 4:
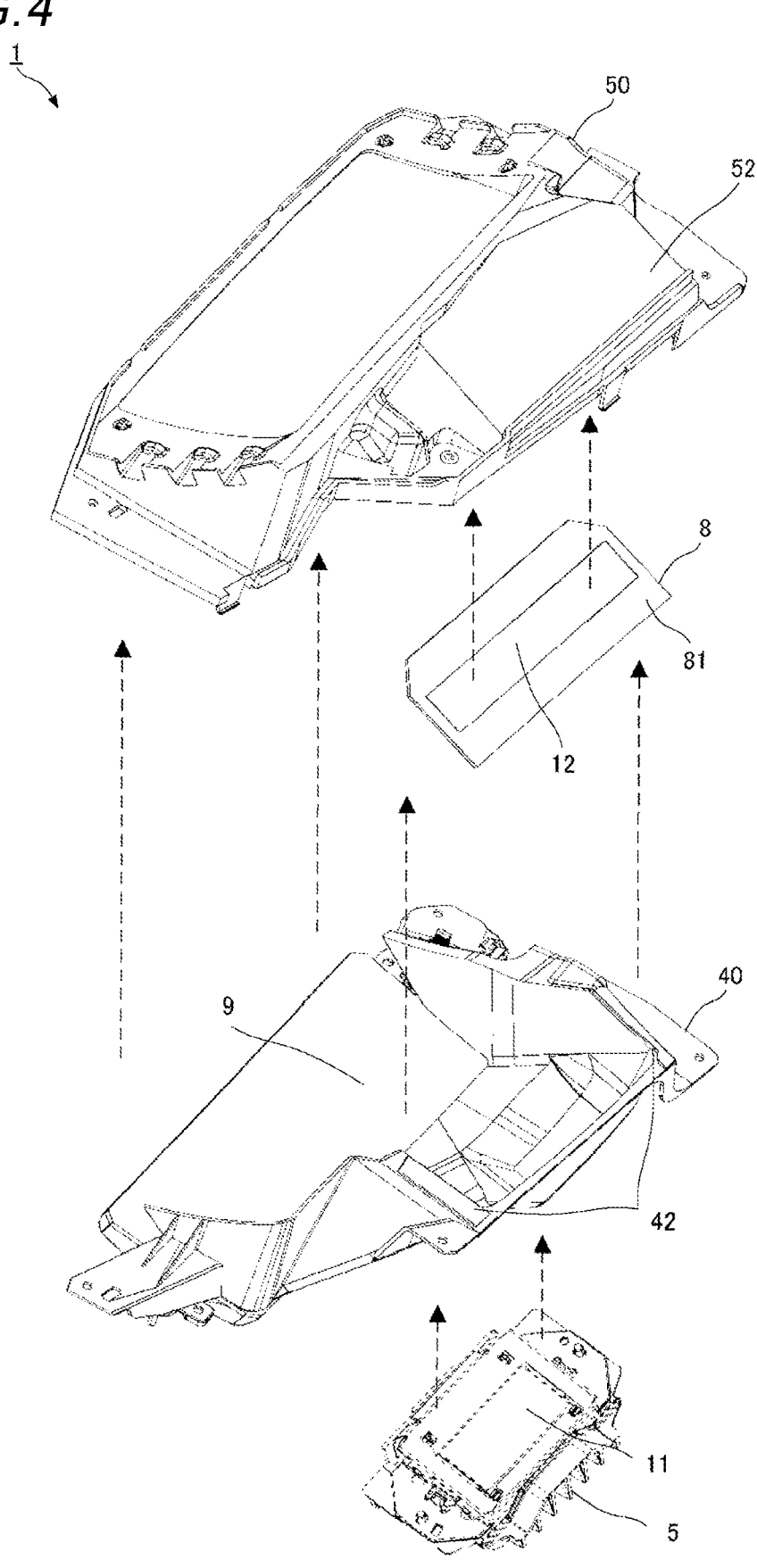
FIG. 4 is an exploded perspective view illustrating the vehicular display device as viewed from above.

As illustrated in FIGS. 3 and 4, the vehicular display device 1 according to the embodiment includes an inner case 40 disposed at a relatively inner position of the vehicle 100, an upper case 50 disposed above the inner case 40, and the backlight unit 5.

The housing 2 illustrated in FIG. 2 is a member that covers the upper case 50 serving as an example of a first case, the inner case 40 serving as an example of a second case, the backlight unit 5, the plane mirror 8, and the concave mirror 9. In the housing 2, the display light L emitted from the backlight unit 5 is reflected by the plane mirror 8 and the concave mirror 9, and reaches the windshield 103 which is a projection target member through the opening 2a. In this manner, it is easy to handle the vehicular display device 1 since the vehicular display device 1 is configured as an integrated unit.

FIG. 3 is a perspective view illustrating the upper case 50 as the upper case 50 is viewed from below. The upper case 50 includes a plane mirror housing space 51 capable of housing the plane mirror 8. In the present example, the plane mirror housing space 51 has a shape substantially conforming to an outer shape of the plane mirror 8. The plane mirror housing space 51 is a dedicated space for placing the plane mirror 8.

FIG. 4 is an exploded perspective view showing the vehicular display device 1 as the vehicular display device 1 is viewed from above, and is an exploded perspective view as viewed from a direction opposite to a viewing direction in FIG. 3. A back surface 81 of the plane mirror 8 which is opposite to the reflection surface is bonded to a bottom plate 52 of the plane mirror housing space 51 via an adhesive tape 12, and the plane mirror 8 is accommodated in the plane mirror housing space 51 and is fixed to the plane mirror housing space 51. The adhesive tape 12 prevents displacement of the plane mirror 8 placed in the plane mirror housing space 51. The reflection surface of the plane mirror 8 is disposed in a manner of facing the concave mirror 9 provided in the inner case 40.

Further, the inner case 40 presses the plane mirror 8 accommodated in the plane mirror housing space 51 against the upper case 50. A packing 42 which is an example of an elastic member is provided on the inner case 40 at a position in contact with the plane mirror 8 during assembly. That is, the packing 42 is located between the plane mirror 8 and the inner case 40.

In the present embodiment, the plane mirror 8 accommodated in the plane mirror housing space 51 of the upper case 50 is pressed against the upper case 50 by the inner case 40, so that the plane mirror 8 can be fixed. Accordingly, a clearance necessary for installation of a fixing component is not necessary, so that a space for fixing the plane mirror 8 can be reduced, as compared with a case where the plane mirror 8 is fixed by clipping. Therefore, a size of the vehicular display device can be reduced. The upper case 50 and the inner case 40 are integrated by being fixed by screwing or the like in a state where the plane mirror 8 is interposed between the upper case 50 and the inner case 40.

When the plane mirror 8 is clip-fastened, the plane mirror 8 may be scratched by a metal clip, or the plane mirror 8 may be contaminated when the plane mirror 8 is manually clip-fastened. Whereas when the plane mirror 8 is fixed by being pressed against the upper case 50, it is possible to reduce adhesion of dirt or scratches during fixing work of the plane mirror 8.

The vehicular display device 1 according to the present embodiment includes the packing 42 between the plane mirror 8 and the inner case 40. Accordingly, the inner case 40 presses the plane mirror 8 via the packing 42, and an impact applied to the plane mirror 8 is absorbed by the packing 42, thereby protecting the plane mirror 8.

Figure 5:
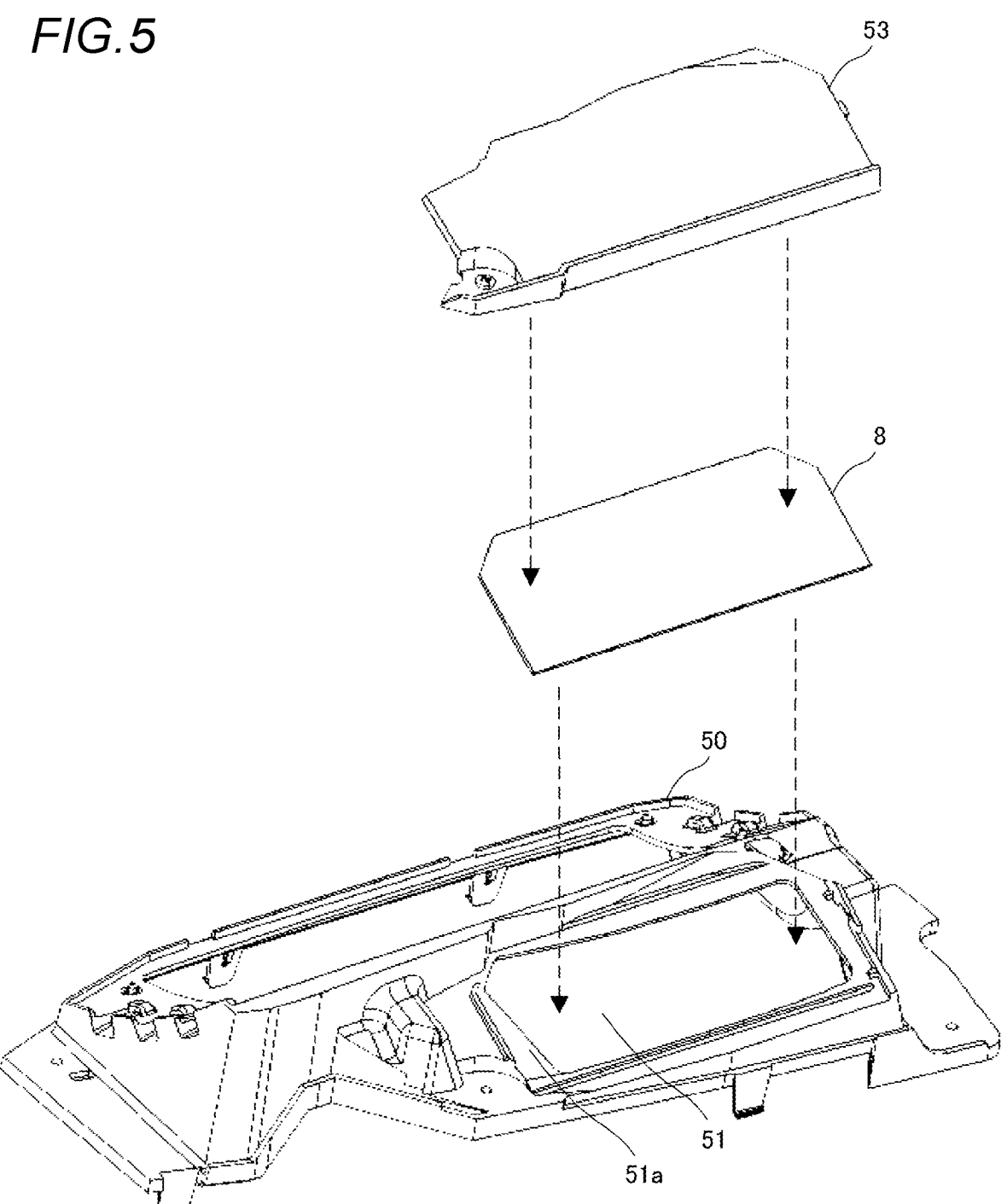
FIG. 5 is a perspective view illustrating an upper case as viewed from above in a modification.

FIG. 5 illustrates a modification of the embodiment illustrated in FIGS. 3 and 4, and is a perspective view illustrating the upper case 50 as the upper case 50 is viewed from above. That is, FIG. 5 is a view as viewed from the same direction as in FIG. 4. In the present example, the plane mirror 8 is provided outside the upper case 50, and a lid 53 is provided above the plane mirror 8. Although not illustrated, the inner case 40 and the backlight unit 5 are provided below the upper case 50 as in FIG. 4.

Different from the embodiment illustrated in FIGS. 3 and 4, the plane mirror housing space 51 has a through hole. An inner side of the upper case 50 is visible through the through hole. The plane mirror housing space 51 illustrated in FIG. 5 does not have the bottom plate 52 (see FIG. 4), and has a support plate 51a around the through hole at a position not covering a screen display area on the reflection surface of the plane mirror 8. In the example illustrated in FIG. 5, the plane mirror 8 is placed on the support plate 51a via an adhesive tape, the lid 53 to which a packing is attached is provided instead of the inner case 40, and the plane mirror 8 is pressed from the outside of the vehicular display device 1, that is, from above in FIG. 5, and is fixed to the upper case 50. In other words, in the present example, the lid 53 serves as a second case that presses the plane mirror 8 accommodated in the plane mirror housing space 51 against the upper case 50. In this manner, even in a case where the plane mirror housing space 51 is provided outside the upper case 50, the plane mirror 8 can be fixed by being pressed as in a case where the plane mirror housing space 51 is provided inside the upper case 50.

Figure 6:
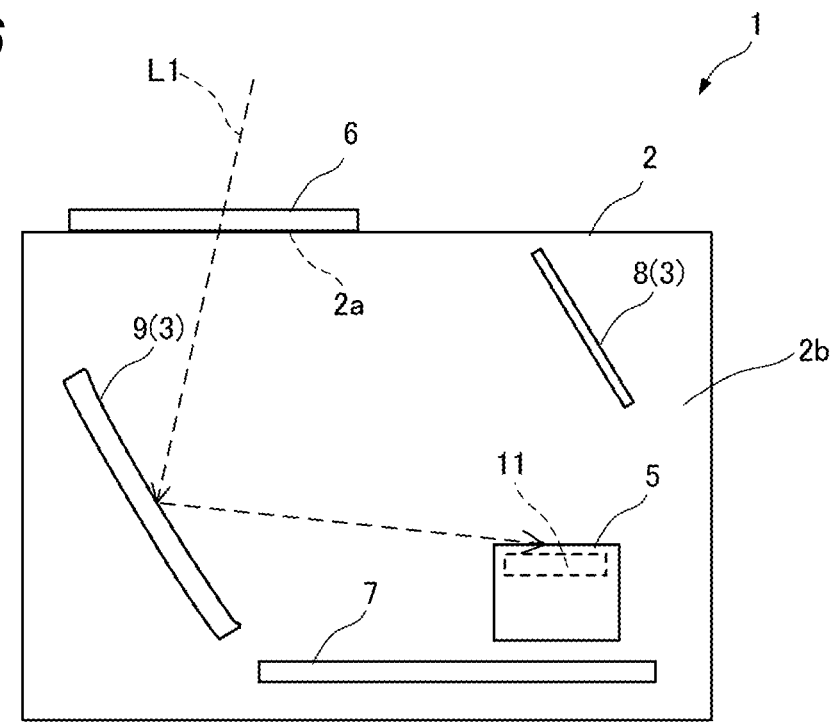
FIG. 6 is a schematic diagram illustrating a schematic configuration of the vehicular display device and illustrates a situation in which external light reaches a backlight unit.

Next, another embodiment of the vehicular display device 1 will be described. FIG. 6 is a schematic diagram illustrating a schematic configuration of the vehicular display device 1, and is substantially similar to that in FIG. 1. FIG. 6 illustrates a situation in which external light L1 coming from the outside passes through the opening 2a of the housing 2, is reflected by the concave mirror 9, and reaches the backlight unit 5.

Figure 7:
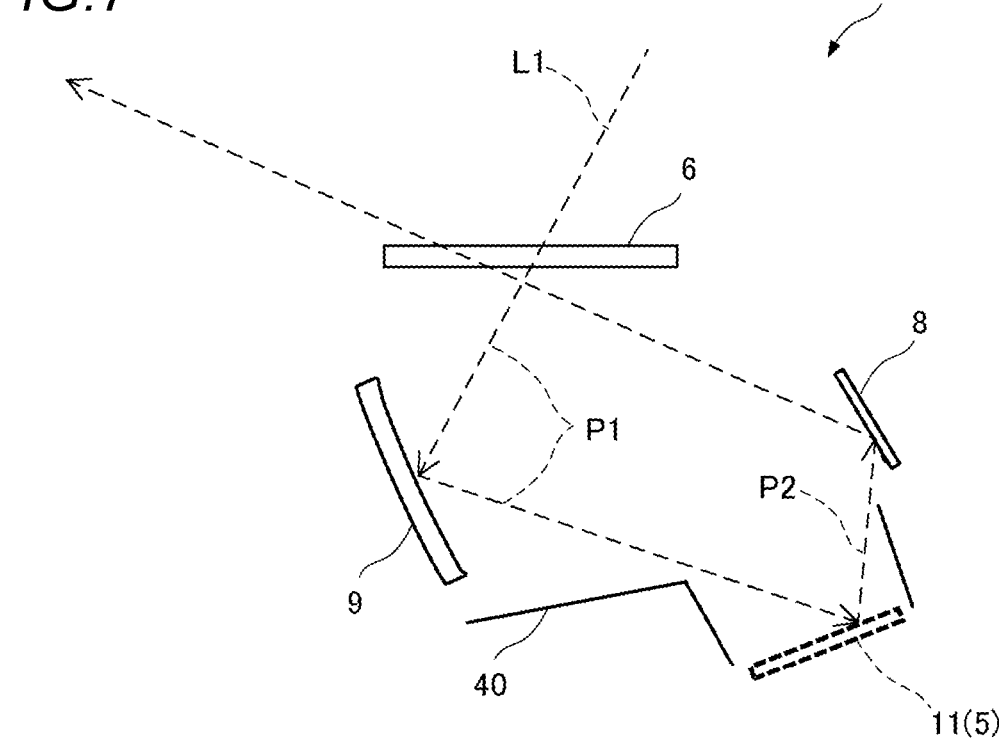
FIG. 7 is a schematic view illustrating an optical path of external light in the vehicular display device.

When the external light L1 reaches the backlight unit 5, particularly the display panel 11 of the backlight unit 5, display may be adversely affected. That is, as illustrated in FIG. 7, the external light L1 coming from the outside passes through a first optical path P1 leading to the backlight unit 5 and reaches the display panel 11. The display panel 11 may reflect the external light L1, and the external light L1 may pass through a second optical path P2 from the backlight unit 5 to the plane mirror 8, may be reflected by the plane mirror 8, then the external light L1 may pass through the opening 2a, and may be emitted to the outside. In such a case, the external light L1 may interfere with the display light L, adversely affect display, and may damage the backlight unit 5.

Figure 8:
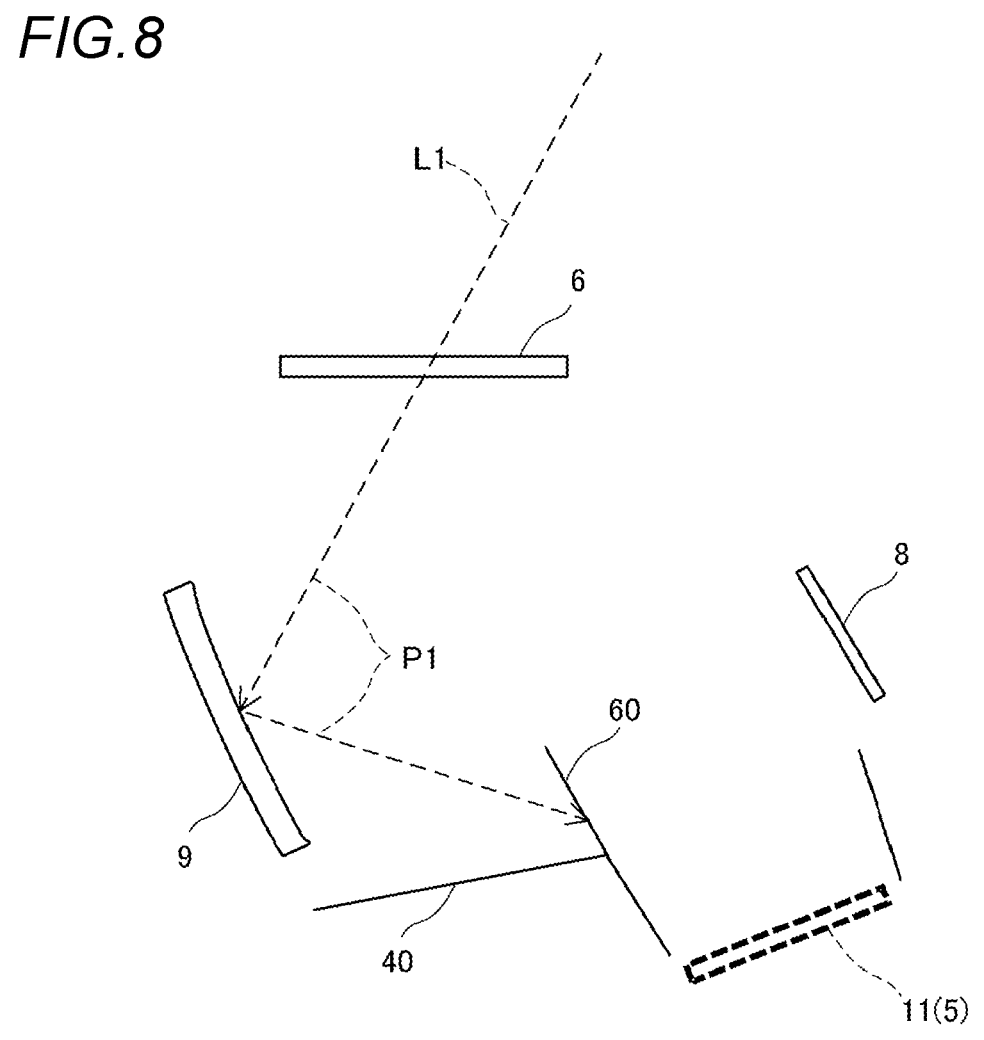

In the present embodiment, as illustrated in FIG. 8, a light shielding wall 60 is provided on the first optical path P1 along which the external light L1 coming from the outside reaches the backlight unit 5 and at a position avoiding the second optical path P2 from the backlight unit 5 to the plane mirror 8. Although the light shielding wall 60 is attached to the inner case 40 in FIG. 8, a position to which the light shielding wall 60 is attached is not limited to the inner case 40, and may be any position in the housing 2. Illustration of the housing 2 is omitted in FIGS. 7 and 8.

As illustrated in FIG. 7, in the vehicular display device 1 in the related art, since no member for shielding the external light L1 is provided on the first optical path P1, the external light L1 reaches the display panel 11. However, in the vehicular display device 1 according to the present embodiment, since the light shielding wall 60 is provided on the first optical path P1, the external light L1 can be shielded. That is, since the external light L1 can be prevented from reaching the backlight unit 5 by the light shielding wall 60, it is possible to avoid a problem such as a stray light phenomenon or thermal damage of the backlight unit 5. Since the light shielding wall 60 is provided at a position avoiding the second optical path P2 from the backlight unit 5 to the plane mirror 8, the display light L emitted from the backlight unit 5 can pass through the second optical path P2 without any problem and reach the plane mirror 8. Further, rigidity of the vehicular display device 1 is improved and vibration resistance is improved by the light shielding wall 60 provided inside the vehicular display device 1.

The present disclosure is not limited to the embodiments described above, and various modifications can be adopted within the scope of the present disclosure. For example, the present disclosure is not limited to the embodiments described above, and modifications, improvements, and the like can be appropriately made. In addition, materials, shapes, sizes, numbers, arrangement positions and the like of components in the embodiments described above are freely selected and are not limited as long as the present disclosure can be implemented. Although an example in which the plane mirror 8 is placed on the support plate 51a via the adhesive tape and the lid 53 to which a packing is attached is provided is described in the embodiments described above, the adhesive tape and the packing are not essential.

An example is described in the embodiments described above in which the housing 2 of the vehicular display device 1 includes three components of the upper case 50, the inner case 40 or the lid 53, and a lower case, the upper case 50 functions as a first case, and the inner case 40 or the lid 53 functions as a second case. However, the first case and the second case are not limited thereto. For example, a housing of the vehicular display device may not include the inner case, may include two components of the upper case and the lower case, the upper case may function as the first case, and the lower case may function as the second case.

Here, features of embodiments of the vehicular display device according to the present disclosure described above are briefly summarized and listed in the following aspects 1 to 4.

According to an aspect 1 of the present disclosure, a vehicular display device (1) includes: a display unit (5) configured to emit a display image including display light, the display image projected onto a projection target member (103) provided in a vehicle (100); a first optical component (8) configured to reflect the display light emitted from the display unit; a first case (50) having a space (51) configured to accommodate the first optical component; and a second case (40, 53) configured to press the first optical component accommodated in the space against the first case.

According to the vehicular display device having the configuration of the aspect 1, the first optical component accommodated in the space of the first case is pressed against the first case by the second case, so that the first optical component can be fixed. Accordingly, a clearance necessary for installation of a fixing component is not necessary, so that a space for fixing the first optical component can be reduced, as compared with a case where the first optical component is fixed by clipping. Therefore, a size of the vehicular display device can be reduced. It is possible to widen the use of the space in the housing of the vehicular display device by reducing the space for fixing the first optical component.

In the case of clip-fastening, the first optical component may be scratched by a metal clip, or the first optical component may be contaminated when the first optical component is manually clip-fastened. On the other hand, according to the vehicular display device having the configuration of the aspect 1, it is possible to reduce adhesion of dirt or scratches during fixing work of the first optical component since the first optical component is fixed to the first case by pressing.

According to an aspect 2 of the present disclosure, in the aspect 1, the vehicular display device further includes an elastic member (42) provided between the first optical component and the second case.

According to the vehicular display device having the configuration of the aspect 2, the second case presses the first optical component via the elastic member, so that an impact applied to the first optical component is absorbed by the elastic member, thereby protecting the first optical component.

According to an aspect 3 of the present disclosure, in the aspect 1, the vehicular display device further includes a light shielding wall (60) that is provided on a first optical path along which external light coming from an outside of the vehicle reaches the display unit and at a position avoiding a second optical path from the display unit to the first optical component.

According to the vehicular display device having the configuration of the aspect 3, since the external light can be prevented from reaching the display unit by the light shielding wall, it is possible to avoid a stray light phenomenon and thermal damage of the display unit. Further, rigidity of the vehicular display device is improved and vibration resistance is improved by the light shielding wall provided inside the vehicular display device.

According to an aspect 4 of the present disclosure, in any one of the aspects 1 to 3, the vehicular display device further includes a housing (2) that covers the display unit, the first optical component, the first case, and the second case and has an opening (2a); and a second optical component (9) configured to reflect the display light reflected by the first optical component. The display light reflected by the second optical component reaches the projection target member through the opening.

According to the vehicular display device having the configuration of the aspect 4, the vehicular display device is configured as an integrated unit, and is easy to handle.

What is claimed is:

1. A vehicular display device comprising:

a display unit configured to emit a display image includ- ing display light, the display image projected onto a projection target member provided in a vehicle;

a first optical component configured to reflect the display light emitted from the display unit;

a first case having a space configured to accommodate the first optical component;

a second case configured to press the first optical com- ponent accommodated in the space against the first case, the first optical component being fixed by being pressed against the first case; and an elastic member comprising packing and provided between the first optical component and the second case, wherein the packing is provided on the second case in a position in contact with the first optical component and the second case, wherein the first case is fixed to the second case with the first optical component interposed therebetween, wherein the first optical component has a back surface and is bonded, via an adhesive, to the space, and wherein the second case is configured to press the first optical component accommodated in the space via the packing against the first case.

2. The vehicular display device according to claim 1, further comprising:

a light shielding wall that is provided on a first optical path along which external light coming from outside of the vehicle reaches the display unit and at a position avoiding a second optical path from the display unit to the first optical component.

3. The vehicular display device according to claim 1, further comprising:

a housing that covers the display unit, the first optical component, the first case, and the second case and has an opening; and a second optical component configured to reflect the display light reflected by the first optical component, wherein the display light reflected by the second optical component reaches the projection target member through the opening.

4. The vehicular display device according to claim 1, wherein the space has a shape substantially conforming to an outer shape of the first optical component.

5. The vehicular display device according to claim 1, wherein the first case is fixed to the second case by screws.

* * * * *